United States Patent [19]
Raj

[11] Patent Number: 5,020,848
[45] Date of Patent: Jun. 4, 1991

[54] CUSTOMIZING AUTOMOBILE BODIES

[75] Inventor: Joseph T. Raj, Riverview, Mich.

[73] Assignee: Evans Industries, Inc., Wayne, Mich.

[21] Appl. No.: 289,232

[22] Filed: Dec. 22, 1988

Related U.S. Application Data

[63] Continuation-in-part of Ser. No. 101,585, Sep. 28, 1987, Pat. No. 4,793,650.

[51] Int. Cl.$^5$ .................. B60J 7/00; B21K 21/16
[52] U.S. Cl. ............................ 296/210; 29/401.1; 296/201
[58] Field of Search .............. 296/201, 210, 211, 145, 296/1.1, 197, 96.19; 29/401.1; 150/52 K; D12/90, 91, 155, 156, 183, 173, 196; 52/22, DIG. 4; 156/245, 219; 47/68; 206/813

[56] References Cited

U.S. PATENT DOCUMENTS

| Re. 30,930 | 5/1982 | Trachtenburg et al. | 206/813 X |
|---|---|---|---|
| 1,610,477 | 12/1926 | Sanford | 206/813 X |
| 3,926,471 | 12/1975 | Nadasi et al. | 296/210 |
| 4,154,473 | 5/1979 | Alexander et al. | 296/210 |
| 4,555,434 | 11/1985 | Kunert | 296/96.19 X |
| 4,775,436 | 10/1988 | Eash | 296/210 X |

FOREIGN PATENT DOCUMENTS 3532682 3/1987 Fed. Rep. of Germany ...... 296/210

Primary Examiner—Robert J. Oberleitner
Attorney, Agent, or Firm—Barnes, Kisselle, Raisch, Choate, Whittemore & Hulbert

[57] ABSTRACT

A customized automobile body and method of changing the appearance of an automobile utilizing a plastic body that has a recess that is adapted to overlie at least a portion of a window of the automobile body, the recess having a base wall and a peripheral wall merging with the remainder of the plastic body. In one embodiment, the recess is filled with a filler and the plastic body is covered with a plastic sheet or woven cloth sheet. In another embodiment, a plastic louver assembly is inserted in the recess. In another embodiment, the base wall of the recess is cut away to expose a portion of the window. In a further embodiment, the window is covered with an overlay of a deeply tinted transparent panel. In one form, the plastic body is a roof cap. In another form, the plastic body overlies a door of the automobile.

14 Claims, 4 Drawing Sheets

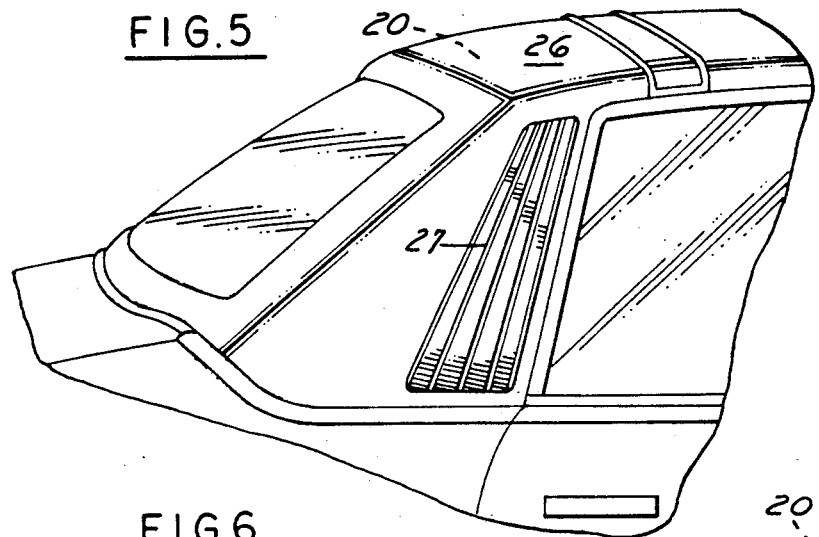
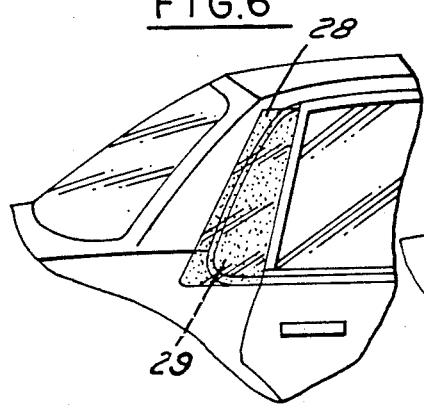
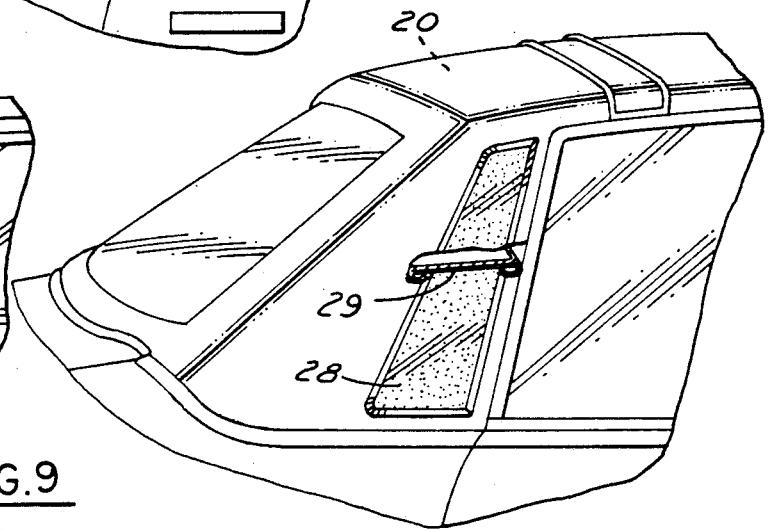
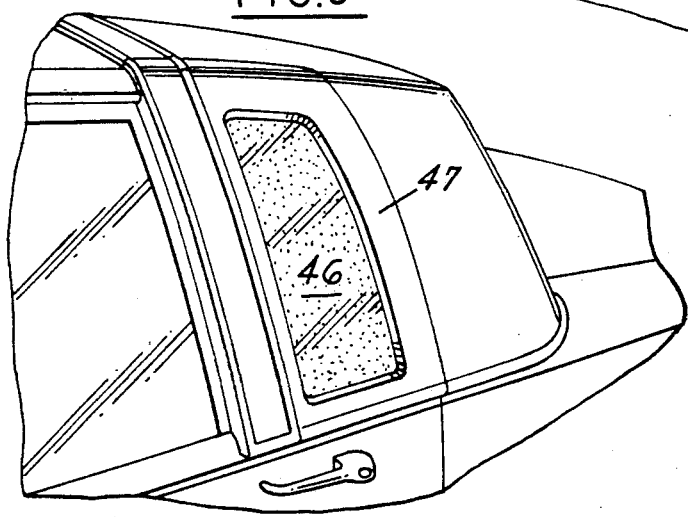
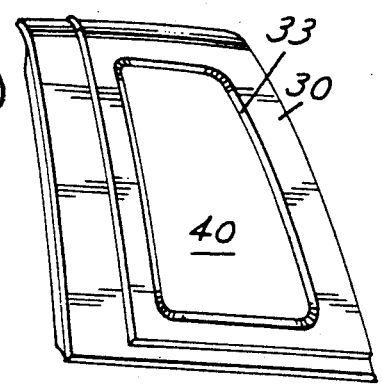

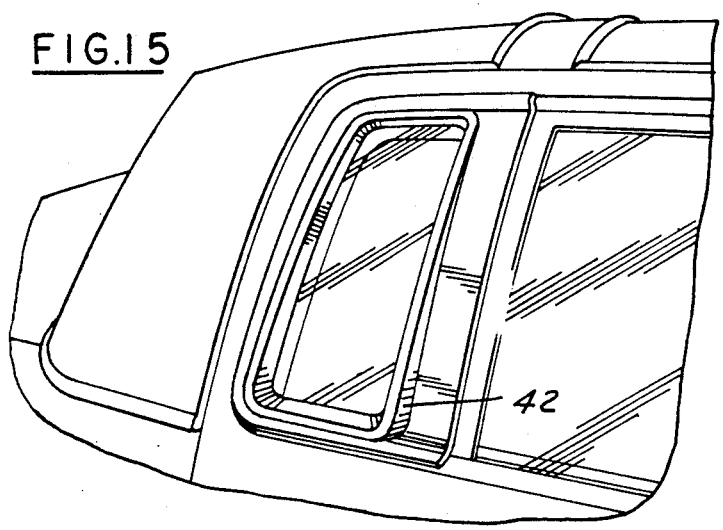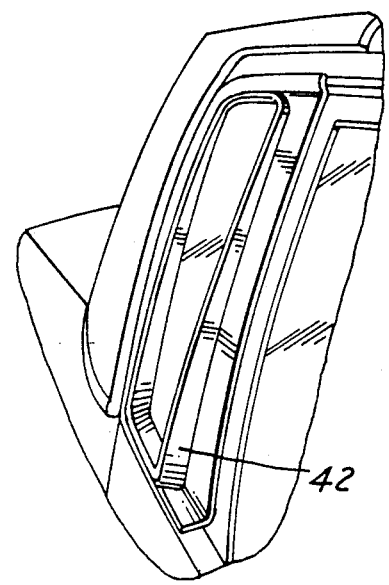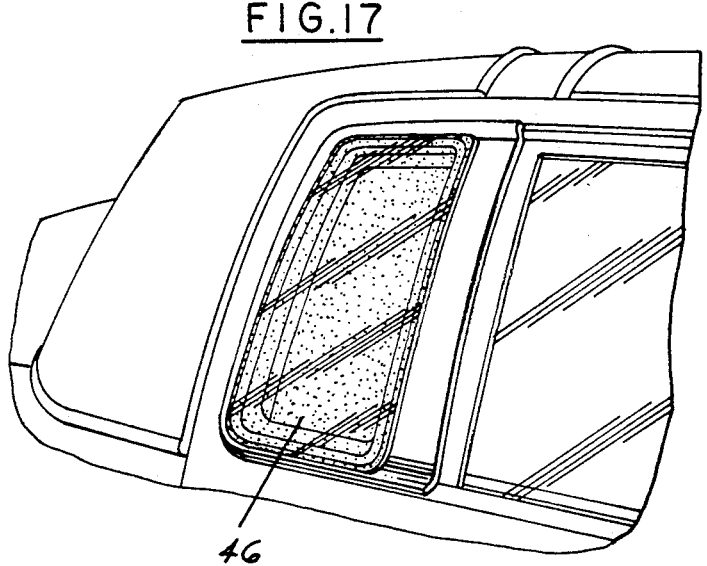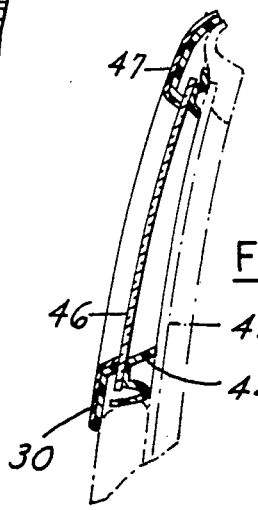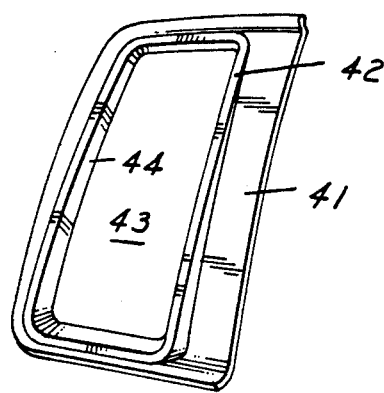

CUSTOMIZING AUTOMOBILE BODIES

This application is a continuation-in-part of my co-pending application Ser. No. 101,585, filed Sept. 28, 1987, now issued as U.S. Pat. No. 4,793,650.

This invention relates to customizing of automobiles.

BACKGROUND AND SUMMARY OF THE INVENTION

A popular and desirable feature of automobiles is the customizing of the body to provide different configurations.

In my aforementioned co-pending application, there is provided a customizing roof construction and method of making for changing the appearance of an automobile which has a side window opening wherein a portion of the body of the automobile covers a desired window position in the customized roof comprising masking a portion of the window while leaving another portion of the window and the portion of the body associated with the window unmasked, applying a deeply tinted transparent panel over the unmasked portion of the window and the portion of the body where it is desired to provide the effect of the desired window, the tinted panel having low light transmission characteristics, applying a roof cap with a window opening corresponding substantially to the area of the tinted panel such as to provide a window having a substantially different configuration from the original window of the automobile with a portion of the window overlying a portion of the body of the automobile.

Among the objectives of the present invention are to provide a customized construction that utilizes a plastic body that overlies a portion of the automobile body which can be modified to provide a solid appearance, a louvered appearance or a window appearance for a portion of the automobile body; which in one form comprises a roof cap; and in which another form comprises a door part.

In accordance with the invention, the customized automobile body and method of changing the appearance of an automobile utilizes a plastic body that has a recess that is adapted to overlie at least a portion of a window of the automobile body, the recess having a base wall and a peripheral wall merging with the remainder of the plastic body. In one embodiment, the recess is filled with a filler and the plastic body is covered with a plastic sheet or woven cloth sheet. In another embodiment, a plastic louver assembly is inserted in the recess. In another embodiment, the base wall of the recess is cut away to expose a portion of the window. In a further embodiment, the window is covered with an overlay of a deeply tinted transparent panel. In one form, the plastic body is a roof cap. In another form, the plastic body overlies a door of the automobile.

DESCRIPTION OF THE DRAWINGS

FIG. 5 is a fragmentary perspective view of a modified form of the invention.

FIG. 6 is a fragmentary view of an automobile during customizing in another embodiment.

FIG. 7 is a view similar to FIG. 6 showing a further view in the customizing.

FIG. 8 is a perspective view of a modified part in a further embodiment of customizing.

FIG. 9 is a fragmentary perspective view showing a customized door of an automobile in the further embodiment of FIG. 9.

FIG. 14 is a fragmentary view of a spacer utilized in a further embodiment of the invention.

FIG. 15 is a fragmentary perspective view of an automobile showing the spacer of FIG. 14 in position.

FIG. 16 is a perspective end view of FIG. 15.

FIG. 17 is a fragmentary perspective view showing the further step in the customizing of the automobile shown in FIGS. 15 and 16.

FIG. 18 is a vertical sectional view showing the final customized automobile of FIGS. 14–16.

DESCRIPTION

Figure 1:
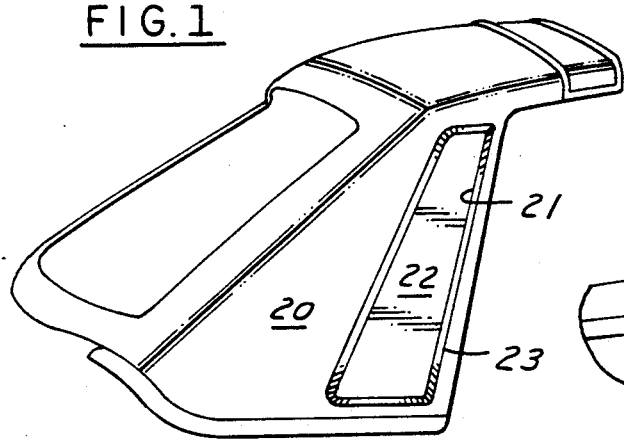
FIG. 1 is a perspective view of a plastic roof cap embodying the invention.
Figure 2:
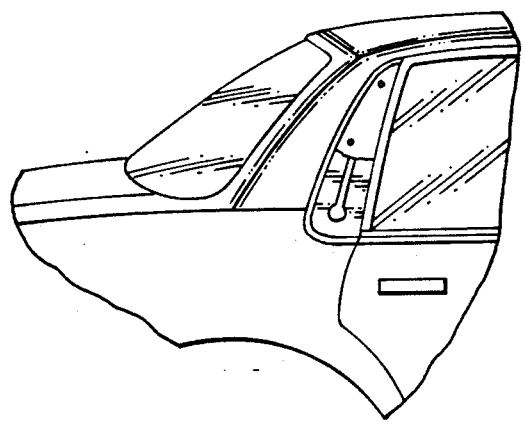
FIG. 2 is a fragmentary side elevational view of an automobile to which the roof cap is applied.
Figure 3:
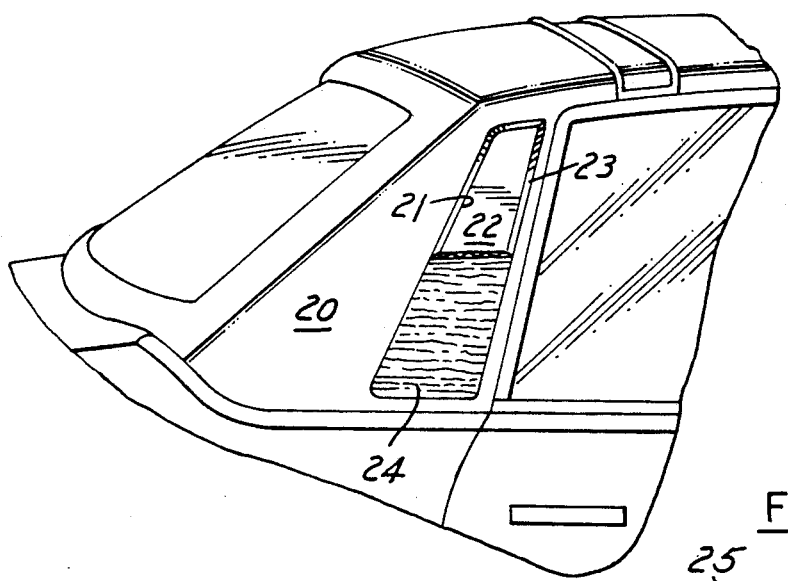
FIG. 3 is a fragmentary perspective view showing an automobile with the roof cap applied.

In accordance with the invention, a customized automobile body and method of changing the appearance of an automobile utilizing a plastic body that has a recess that is adapted to overlie at least a portion of a window of the automobile body, the recess having a base wall and a peripheral wall merging with the remainder of the plastic body. In one embodiment, the recess is filled with a filler and the plastic body is covered with a plastic sheet. In another embodiment, a plastic louver assembly is inserted in the recess. In another embodiment, the base wall of the recess is cut away and a sheet of transparent plastic, preferably tinted, is positioned to simulate a window. In a further embodiment, the window is covered with an overlay of a deeply tinted transparent panel. In one form, the plastic body is a roof cap. In another form, the plastic body overlies a door of the automobile.

Referring to FIGS. 1–4, the invention is shown as applied to a roof cap on an automobile wherein the roof cap comprises a plastic body 20 having opposed recesses 21, one of which is shown, including a base wall 22 and a peripheral flange 23 extending from the main portion of the body of the roof cap. In accordance with the invention, the recess 21 filled with a filler or with a louver or the base wall of the recess can be cut away to overlie a portion of the window of the automobile.

Figure 4:
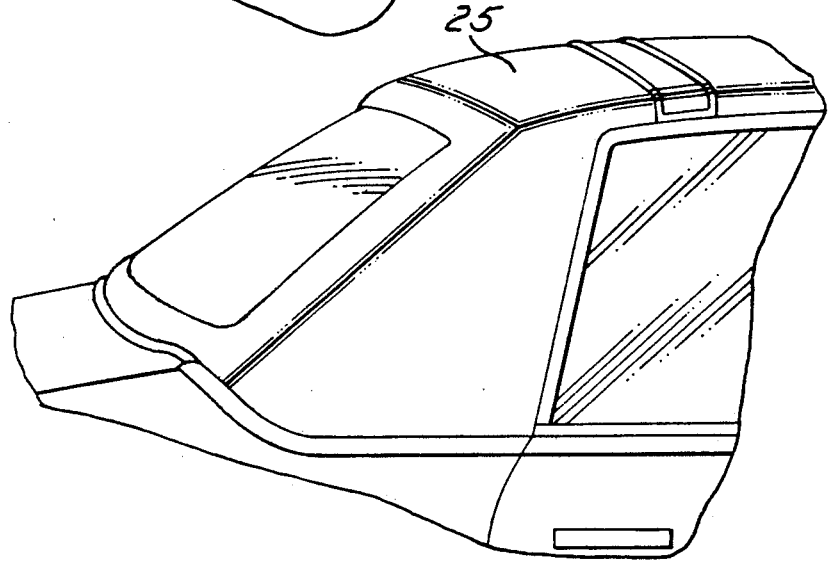
FIG. 4 is a fragmentary perspective view of an automobile with the completed and covered roof cap.

In the embodiment shown in FIGS. 1–4, the trim is removed from the window on the side of the body (FIG. 2), the plastic roof cap is applied and a filler 24 is provided in the recess 21 either before or after the cap is applied, to form a surface that is flush with the remainder of the side wall of the roof cap. A vinyl covering 25 or woven cloth covering is then applied to produce the effect as shown in FIG. 4.

Alternatively, as shown in FIG. 5, the roof cap 20 can be applied to the vehicle and a vinyl covering 26 applied over the roof cap. A prefabricated plastic louver assembly 27 is then provided in the recess over the base wall 22 to provide a simulated louver effect.

In the form shown in FIG. 7, a deeply tinted plastic sheet 28 larger than the base wall of the plastic body is fastened over a body portion 29 of the side of the vehicle which has no window (FIG. 6). The base wall 22 is cut away and then the roof cap 20 is placed in position to provide a simulated window. Vinyl covering may be provided as in the previous forms.

Figure 11:
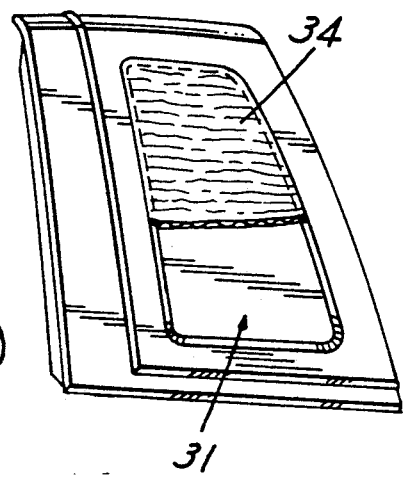
FIG. 11 is a view similar to FIG. 10 showing the part in a different embodiment.
Figure 12:
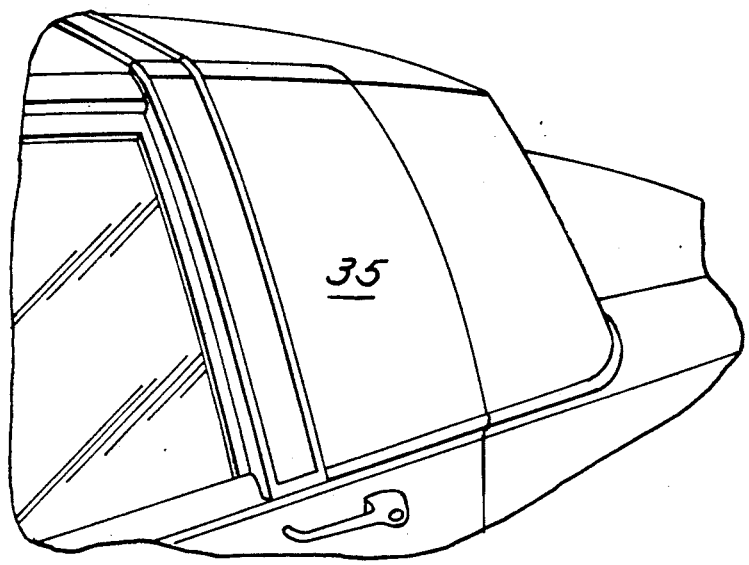
FIG. 12 is a fragmentary perspective view of an automobile showing the part of FIG. 11 in complete customized relationship to the car.
Figure 10:
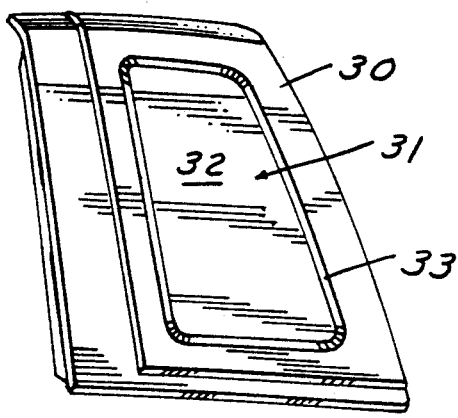
FIG. 10 is a perspective view of an insert utilized in the customizing shown in FIG. 9.

Referring to FIG. 10, a plastic body part 30 is formed that is adapted to be mounted on a door of an automobile and, as in the previous form, has a recess 31 with a base wall 32 and a peripheral wall or flange 33. Recess 31 can be filled with a filler 34 (FIG. 11) and placed in position on the door 31 after which it can be covered with a vinyl covering 35 to produce the effect as shown in FIG. 12.

Figure 13:
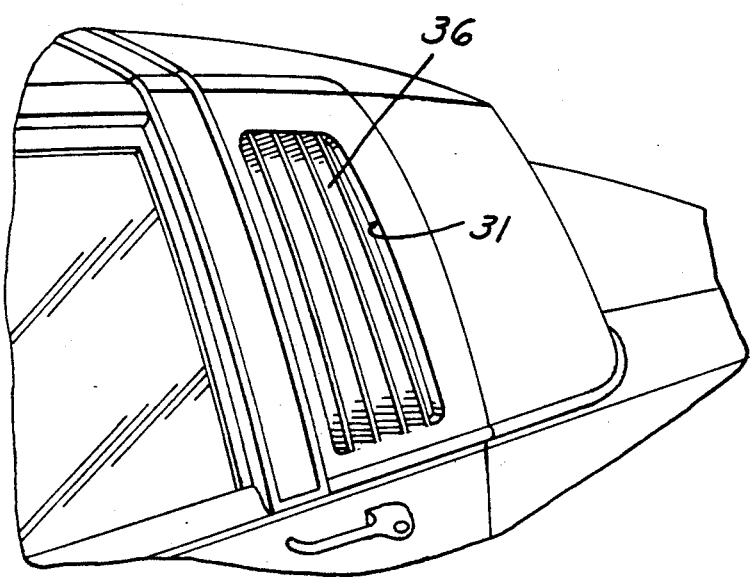
FIG. 13 is a fragmentary perspective view of a further embodiment of the invention.

Alternatively as shown in FIG. 13, a prefabricated louver assembly 36 can be positioned in the recess 31 to produce a simulated louvered window.

In a different embodiment, shown in FIGS. 8 and 9, 17 and 18, the plastic body part 30 can be used by cutting out the base wall 32 leaving the flange 33 and defining an opening 40 (FIG. 8). In this form a spacer 41 and has an inwardly extending flange 44 that contacts the existing window 45 of the door. A deeply tinted plexiglass sheet 46 is then fixed on the flange 42 and the body part 30 with the base wall cut away is placed over the glass (FIG. 17) and then the cover 30 is placed over the tinted glass and fastened thereto. Finally a vinyl covering 47 is provided about the periphery of the body to provide completed appearance as shown in FIGS. 9 and 18.

The basic components for customizing can be provided in the form of a kit. In the case of customizing the roof, the customizing kit comprises the roof cap 20, louver assembly 27 and deeply tinted plastic sheet 28. In the case of customizing a door, the customizing kit comprises plastic body part 30, louver assembly 36, spacer 41 and deeply tinted plastic sheet 46.

It can thus be seen that there has been provided a customized construction that utilizes a plastic body that overlies a portion of the automobile body and which can be modified to provide a solid appearance, a louvered appearance or a window appearance; which in one form comprises a roof cap; and in which another form comprises a door part.

I claim:

1. A customizing kit for an automobile body comprising
    a plastic body having a recess that is adapted to overlie a portion of the automobile body,
    said recess of said plastic body comprising a base wall and a peripheral flange,
    a louver body adapted to be inserted in said recess,
    and a deeply tinted plastic sheet adapted to be interposed between the plastic body and the body of the automobile when the base wall of the recess is cut away,
    said plastic body comprising a part adapted to overlie the door of an automobile.

2. The customizing kit set forth in claim 1 including an insert adapted to be interposed between the plastic body and the door before the plastic body is placed in position to space the plastic sheet from an existing window in the door.

3. A customizing kit for an automobile body comprising
    a plastic body having a recess that is adapted to overlie a portion of the automobile body,
    said recess of said plastic body comprising a base wall and a peripheral flange,
    a louver body adapted to be inserted in said recess,
    and a deeply tinted plastic sheet adapted to be interposed between the plastic body and the body of the automobile when the base wall of the recess is cut away,
    said sheet being larger than the base wall of said plastic body.

4. The customizing kit set forth in claim 3 wherein said plastic body comprises a roof cap.

5. The method of customizing an automobile which comprises
    providing a fist plastic body having a recess that is adapted to overlie at least a portion of a window in an automobile body,
    said recess in said plastic body comprising a base wall and a peripheral flange surrounding said wall,
    positioning said plastic body on said portion of said automobile with the recess overlying at least a portion of the window,
    providing a louver body which fills said recess, and inserting said louver body in said recess.

6. The method of customizing an automobile which comprises
    providing a plastic body having a recess that is overlying at least a portion of an automobile body,
    said recess in said plastic body comprising a base wall and a peripheral flange surrounding said wall,
    cutting away the base wall of said recess in said plastic body,
    positioning a deeply tinted transparent sheet over said portion of said automobile body, and
    positioning said plastic body on said portion of said automobile over the sheet to simulate a window.

7. The method of customizing an automobile which comprises
    providing a first plastic body having a recess that is adapted to overlie at least a portion of a window of a door of an automobile body,
    said recess in said plastic body comprising a base wall and a peripheral flange surrounding said wall,
    providing a second body in said insert which fills said recess,
    positioning said plastic body on said portion of said automobile.

8. The method set forth in claim 7 wherein said second body comprises a louver.

9. The method of customizing an automobile which comprises
    providing a plastic body having a recess that is adapted to overlie at least a portion of a window of a door of an automobile body,
    said recess in said plastic body comprising a base wall and a peripheral flange surrounding said wall,
    cutting away the base wall of the recess to define an opening in the base wall,
    positioning a spacer in said recess,
    positioning a sheet of deeply tinted transparent glass sheet over said spacer to space said deeply tinted sheet over said window of said door,
    positioning said plastic body on said portion of said automobile so that at least a portion of the opening in the base wall of the recess overlies a portion of the deeply tinted sheet.

10. A customizing automobile body comprising an automobile body having a door with a window, a plastic body having a recess overlying a portion of said window, said recess including a peripheral flange defining an opening overlying said window and having an exposed portion, a spacer in said recess engaging said window and surrounding said opening, a deeply tinted transparent sheet overlying said spacer in spaced relation to said window, and a covering overlying said plastic body and the exposed portion of the flange.

11. A customizing kit for an automobile body comprising a plastic body having a recess that is adapted to overlie a portion of the automobile body, said recess of said plastic body comprising a base wall and a peripheral flange, and a deeply tinted plastic sheet adapted to be interposed between the plastic body and the body of the automobile when the base wall of the recess is cut away, said sheet being larger than the base wall of said body, said plastic body comprising a part adapted to overlie the door of an automobile.

12. The customizing kit set forth in claim 11 including an insert adapted to be interposed between the plastic body and the door before the plastic body is placed in position to space the plastic sheet from an existing window in the door.

13. A customizing kit for an automobile body comprising a plastic body having a recess that is adapted to overlie a portion of the automobile body, said recess of said plastic body comprising a base wall and a peripheral flange, and a deeply tinted plastic sheet adapted to be interposed between the plastic body and the body of the automobile when the base wall of the recess is cut away, said sheet being larger than the base wall of said body, said plastic body comprising a roof cap with said recess adapted to be positioned such that said recess is adjacent the side window on the roof of the automobile.

14. A customized automobile body comprising an automobile body having a roof with a window, a plastic body having a recess overlying a portion of said window, said recess including a peripheral flange defining an opening overlying the opening in said recess and said window, a deeply tinted transparent sheet engaging said flange and overlying said window, and a covering overlying said plastic body and the exposed portion of the flange.

* * * * *